United States Patent [19]

Isaksson

[11] Patent Number: 4,669,931
[45] Date of Patent: Jun. 2, 1987

[54] DRILL FOR GENERATING A HOLE IN A WORK PIECE

[75] Inventor: Karl B. Isaksson, Sandviken, Sweden

[73] Assignee: Santrade Limited, Lucerne, Switzerland

[21] Appl. No.: 719,553

[22] Filed: Apr. 3, 1985

[30] Foreign Application Priority Data

Apr. 9, 1984 [SE] Sweden ............................ 8401964

[51] Int. Cl.$^4$ ............................................ B23B 51/04
[52] U.S. Cl. ................................ 408/206; 408/203.5; 408/224; 408/229; 408/703
[58] Field of Search ............... 408/144, 145, 204, 205, 408/206, 223, 224, 225, 229, 59, 703, 713, 207, 211, 212, 213, 189, 203.5; 125/20; 144/219

[56] References Cited

U.S. PATENT DOCUMENTS 2,978,002 4/1961 Ransom .............................. 408/205
3,546,980 12/1970 Lemanski .......................... 408/189
3,548,687 12/1970 Holloway .......................... 408/206
4,338,050 7/1982 Ozer et al. ........................ 408/211
4,352,610 10/1982 Yankovoy et al. ................ 408/207

FOREIGN PATENT DOCUMENTS 777245 2/1935 France .............................. 408/205

Primary Examiner—Joseph H. McFlynn
Assistant Examiner—A. Dougas
Attorney, Agent, or Firm—Burns, Doane, Swecker & Mathis

[57] ABSTRACT

A drill for drilling of work pieces, preferably of composite materials, comprising a cylindrical shank portion (11), a first cutting edge (13) in form of an arc of a circle arranged in the cutting end of the drill and a second cutting edge (16) perpendicularly connected thereto. The edges (13,16) are preceded in the rotational direction by a third cutting edge (14) which during the drilling cuts away the material radially inside a circular groove which is cut by the first and the second cutting edges (13,16).

15 Claims, 7 Drawing Figures

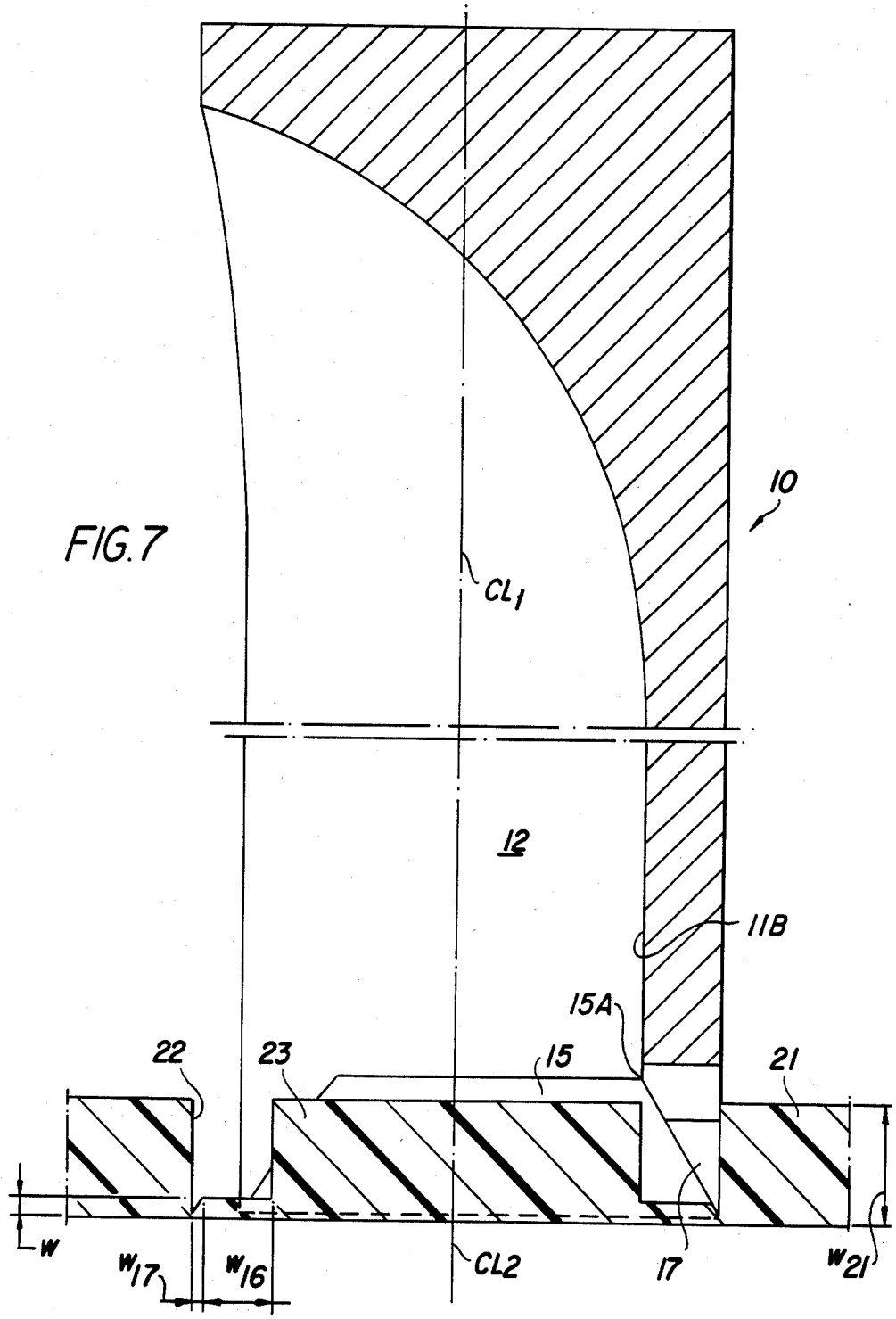

DRILL FOR GENERATING A HOLE IN A WORK PIECE

BACKGROUND AND OBJECTS OF THE INVENTION

The present invention relates to a drill for generating a hole in a work piece, preferably in a composite of at least a first material and a second material having a higher modulus of elasticity than the first material.

Known drills for drilling of composite materials have a shape similar to those of drills for wood comprising a centering tip and cutting edges arranged symmetrically therearound. A disadvantage with these drills is that they tear off the fibers arranged in the composite material, especially at the exit part of the hole when the drill penetrates the material. The fibers will therefore be forced outwardly at the exit part of the hole so that the hole obtains a very fringy end and/or delamination in the surrounding fiber layers. Furthermore the areas between the cutting tips and the centering tip will be filled up with cut material drilling of sandwich panels which disturbs the continous drilling in the material. The known drills are sensitive to shivering of the cutting edges. Furthermore, the center part of the drill cuts negatively, i.e. it presses the material before it, which prevents a clean cutting operation of the hole and raises the temperature in the cutting area so that the matrix material, for example epoxy, melts and flows out of the hole wall and thereby deteriorates the strength of the hole area.

The object of the present invention is to attain a drill for drilling of work pieces preferably of composite material through which shape the above-mentioned disadvantages are avoided.

DESCRIPTION OF THE DRAWINGS

The invention will be more closely described in the following with reference to the attached drawings wherein further characterizing features and advantages of the invention will be apparent.

FIG. 7 shows a cross section of the work piece being drilled, according to line VII—VII in FIG. 6.

DESCRIPTION OF A PREFERRED EMBODIMENT OF THE INVENTION

Figure 1:
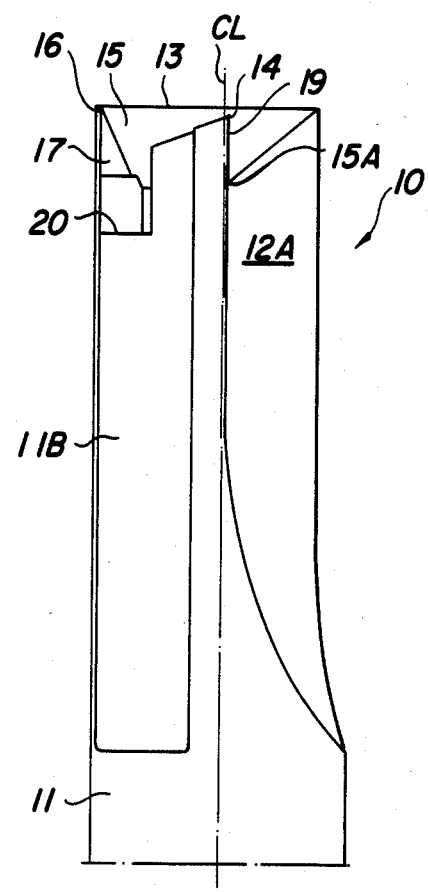
FIGS. 1 and 2 show a cutting end of a drill according to the invention in different side views.
Figure 2:
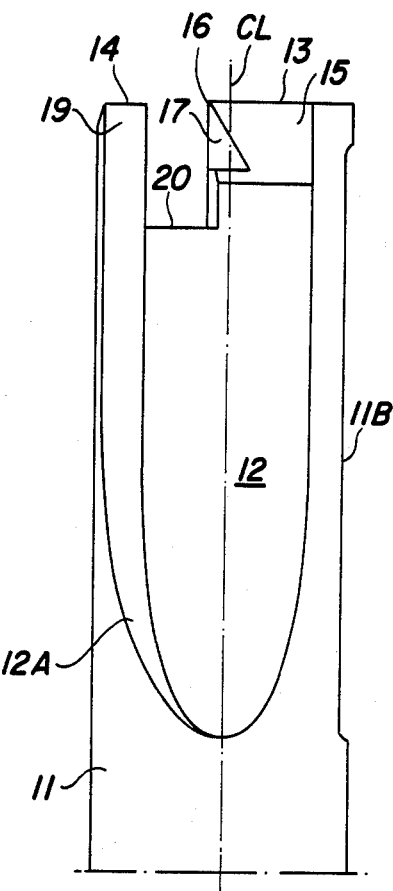
Figure 3:
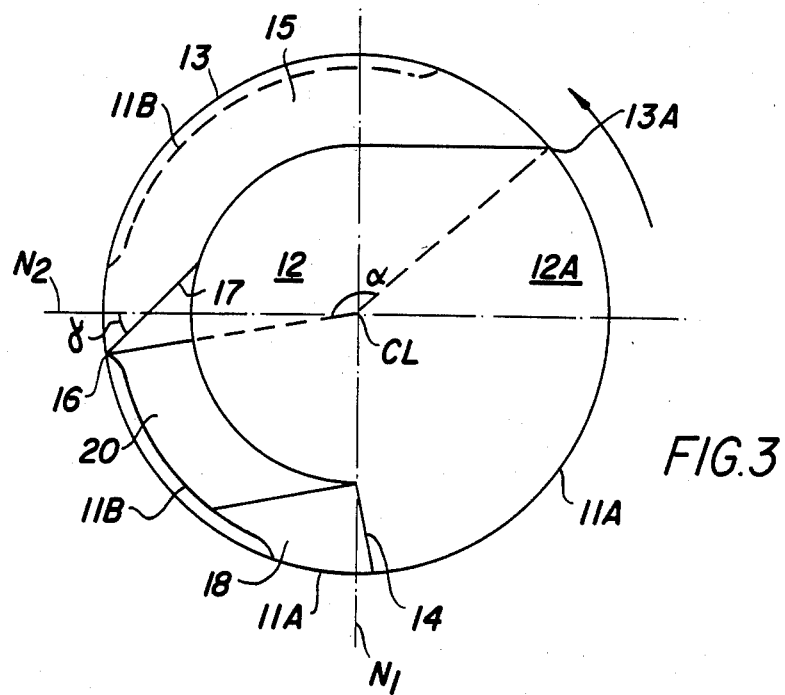
FIG. 3 shows the drill according to FIG. 1 in a top view.

FIGS. 1–4 show a drill 10 for drilling in a composite material such as for example an epoxy reinforced by glass-, carbon- or Kevlar ®-fibers or a sandwich panel which is a laminate of a spacer material, such as honeycomb core portion sandwiched between fiber reinforced sheets of plastics. The drill 10 comprises a cylindrical, oblong shank portion 11, a first flute 12, a second flute 12A, a first cutting edge 13, a second cutting edge 16, and a third cutting edge 14. The shank portion 11 is arranged to be secured to a chuck of a drilling machine, not shown. The first flute 12 and the second flute 12A are ground of a massive body, preferably of hard metal. The depths of the passages successively diminish axially inwards and end in the envelope surface 11A of the drill 10 in direction towards the securing end of the drill. The first flute 12 will receive a core or a plug drilled out of the composite material. The second flute 12A will receive chips cut from the composite material. The first cutting edge 13 is arranged in i.e., is flush with, the envelope surface 11A of the drill and coincides with this along an arc of a circle, which is defined by the midpoint angle $\alpha$ and the radius of the drill. The angle $\alpha$ is selected from the interval 30 to 160°, preferably 100° to 150°. The first cutting edge 13 is surrounded by the envelope surface 11A and a first chip surface 15, which intersects an inner surface 11B of the first flute 12 at a location 15A (FIG. 7) disposed longitudinally rearwardly and radially inwardly of the first cutting edge 13. Those surfaces 11A, 15 are separated in a cross section in a plane normal to the envelope surface by an internal angle, the edge angle, of about 20° to 40°, preferably 30°. The center line of the first flute 12 mainly coincides with the center line CL of the drill 10. The radius of the first flute lies in the interval 50 to 75% of the radius of the drill, preferably 60 to 65%. Tne depth of the first flute 12 is chosen depending of the thickness of the material. The first flute is opened towards and in the envelope surface of the drill by the second flute 12A which opens the first flute about along half of its circumference, see the dotted half of a circle in FIG. 3. The first cutting edge 13 terminates in its front end with respect to its rotational direction, see arrow in FIG. 3, in an axially directed second cutting edge 16 which posseses a positive cutting geometry through the presence of a second chip surface 17. The second cutting edge 16 precedes the first cutting edge 13 in the rotational direction of the drill. The main extension of the second cutting edge is parallel to the center line CL of the drill. The third cutting edge 14 is arranged a distance in front of the second cutting edge 16 in the rotational direction and extends from the envelope surface 11A inwardly towards the center of the drill or so that an extension of the third cutting edge 14 forms a chord in the circular periphery of the first flute 12. The third cutting edge lies in a plane normal to the center line CL of the drill and has an extension which at least corresponds to 20% of the radius of the drill, preferably 25 to 50%. A longitudinally rearmost end of the third cutting edge is situated longitudinally forwardly of a rearmost point 15A of the chip surface (see FIG. 1). The third cutting edge 14 is surrounded by a clearance face 18, a third chip surface 19 and the envelope surface 11A. An opening 20 is arranged between the second cutting edge 16 and the clearance face 18, which acts as space for a grinding tool at the production of the drill. The corner between the second cutting edge 16 and the first cutting edge 13 has been made sharp in this embodiment, but the edges may alternatively be joined by a rounded portion. The first cutting edge may alternatively be shaped out of a number of separated segments. The third cutting edge 14 is inclined at an angle relative to a normal $N_1$ of the center line CL. This angle is selected from the interval 5° to 20°. The third cutting edge 14 may also be inclined relative plane normal to the center line CL. The angle $\gamma$ defining the inclination of the second chip surface 17 relative to a normal $N_2$ of the periphery of the drill so that the effective 10 shown in FIG. 3 is between 45° to 60° so that the effective rake angle of the second cutting edge 16 will be about 30°. In order to reduce the friction between the envelope surface 11A and the work piece portions of the drill 10 defining the envelope surface 11A are removed, to form two axially extending, spaced apart radial relief segments 11B. These segments 11B have a radial dimension less than the maximum radial dimension of the drill 10. The segments of the envelope surface adjacent the radial relief segments constitute at least three axially extending wear strip segments of the envelope surface 11A. The wear strips have a radial dimension which is the maximum radial dimension of the drill. Thus, during a drilling operation, the wear strip segments of the envelope surface serve to guide the drill within the hole being formed. The wear strips are shown only in FIGS. 1-3.

Figure 5:
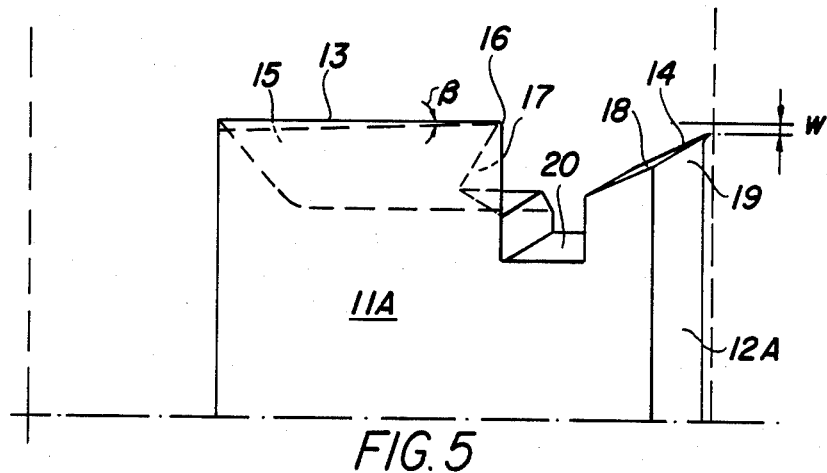
FIG. 5 shows a part of the cutting end of the drill spread in a plane.
Figure 4:
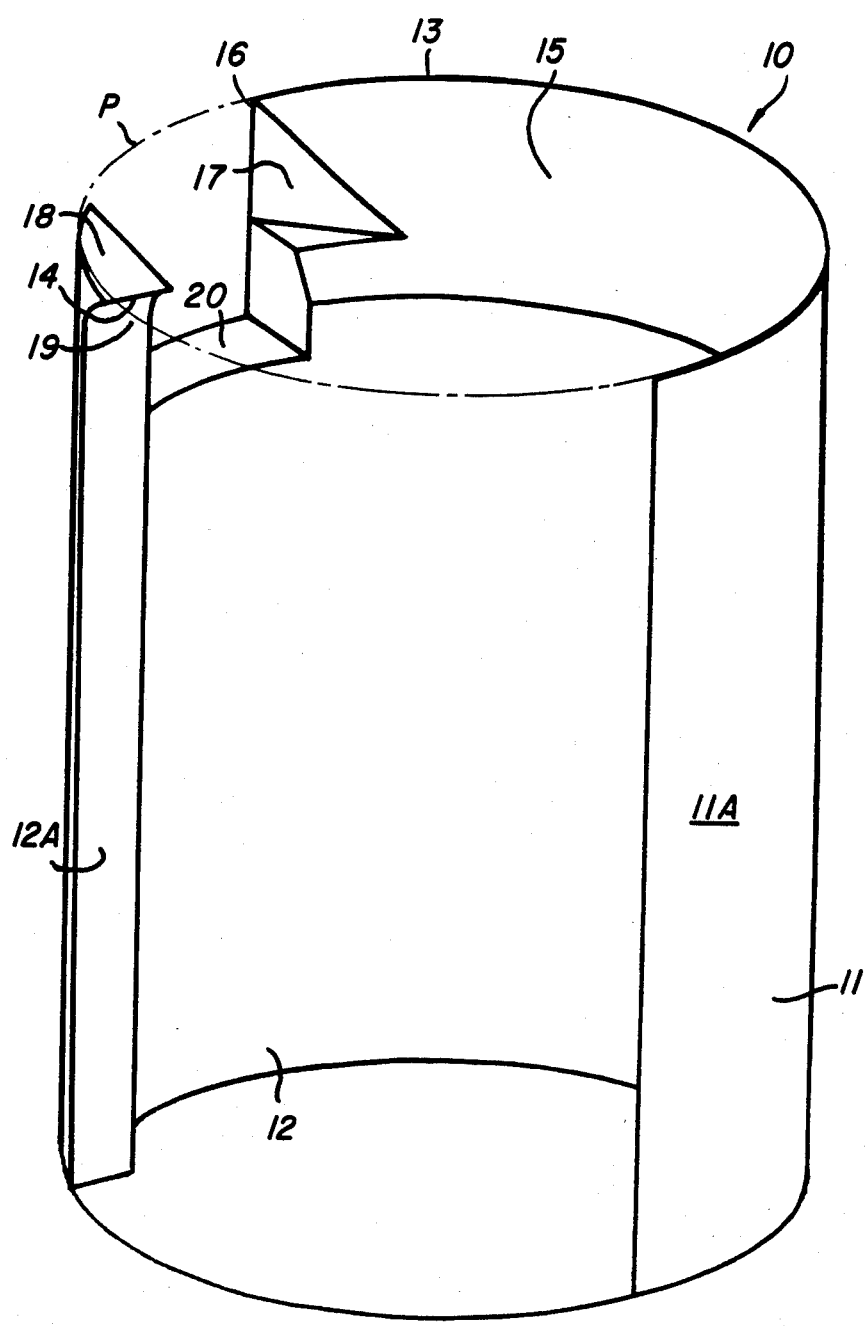
FIG. 4 shows the cutting end of the drill in a perspective view.

In FIG. 5 is shown an upper part of the cutting end of the drill 10, which has been spread in the figure for better disclosing of the invention. The envelope surface 11A of the drill is turned towards the viewer. The axially outermost part of the third cutting edge 14 is arranged axially inside the axially outermost part of the main cutting edge 13 so that the third cutting edge engages the work piece shortly after the engagement thereof by the first cutting edge. The length of the third cutting edge 14 is at least 20% of the radius of the drill, preferably 25 to 50%. The distance w between the main axial position of the third cutting edge and the main axial position of the first cutting edge may be between 1 to 20% of the length of the third cutting edge, corresponding to about 0.1-0.3 mm. The third cutting edge 30 coincides in FIG. 1 with a plane normal to the center line CL of the drill but it may also be angled such that the inner end of the third cutting edge is axially closer to the securing end of the drill compared to the radially outer end of the third cutting edge. This inclination is selected to a maximum of 30°. The first cutting edge 13 is perpendicular to the center line in FIG. 3, but may alternatively be somewhat inclined relative to a plane P normal to the center line CL such that the end of the first cutting edge farthest away from the third cutting edge in FIG. 3 will be positioned axially closer to the securing end of the drill compared to the other end of the first cutting edge. This angle β has a maximum of 2°.

Figure 6:
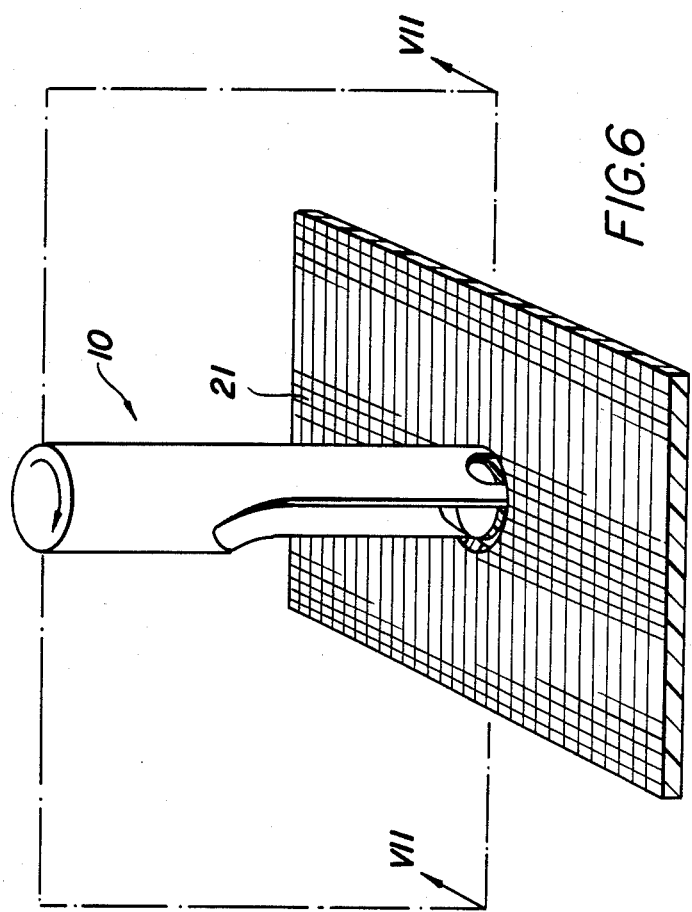
FIG. 6 shows a perspective view of the drill in engagement with a work piece.

Referring to FIGS. 6 and 7 a composite 21 is schematically illustrated in which an annular groove 22 is being drilled by a drill according to the invention. The composite 21 has been drilled just about through its width $w_{21}$. The groove 22 has a center line $CL_2$ which coincides with the center line $CL_1$ of the drill 10. The drill 10 produces a core 23 in the composite 21 which is received by the first flute 12.

When the drill 10 is rotated and moved towards the work piece surface the first cutting edge 13 will engage with this surface and the second cutting edge 16 will first slot a groove in the work piece whereafter the fibers which have been pressed under the second cutting edge will be cut by the following first cutting edge, the large circumferential length of which prestresses the fibers before cutting. The second chip surface 17 has an extension $w_{17}$ in this view, which is approximately 5 to 15% of the distance w, however exaggerated in FIG. 6. The second chip surface 17 will force the material positioned radially inside the periphery of the groove 22 radially inwards. The hole achieves a high quality surface with this introductory machining after which the third cutting edge cuts away the material being situated radially inside the periphery of the hole corresponding to the width $w_{16}$ in FIG. 6 so that the material does not rub against the first chip surface 15 of the first cutting edge 13 and thus do not contribute to raising of the temperature in the machining area.

Thus, the present invention relates to a drill for drilling of composite materials through which shape the machined hole achieves a clean structure and both the entrance part and the exit part of the hole will be given an appearance free from fringes and delamination. The drill described herein can be used to generate holes in a wide variety of composites having one material which has significantly higher elasticty and/or tensile strength than other material in the composite.

I claim:
1. Drill for cutting a hole in a workpiece, comprising:
   a shank having a substantially cylindrical envelope surface, and including a front longitudinal cutting end, said shank being rotatably about a longitudinal center line and including a recess extending longitudinally from said front end and opening radially outwardly into said envelope surface to form an outlet for cuttings, said recess including an inner surface of said shank disposed radially inwardly of said envelope surface,
   a generally circumferentially extending first cutting edge configured as an arc of from 30 to 160 degrees disposed at a longitudinally front edge of said envelope surface and lying flush with said envelope surface,
   a chip face extending from said first cutting edge and intersecting said inner surface at a location disposed longitudinally rearwardly and radially inwardly of said first cutting edge,
   said first cutting edge terminating at a second cutting edge which extends generally longitudinally rearwardly from said front cutting end and which lies flush with said envelope surface, said second cutting edge situated at a circumferentially forward end of said first cutting edge with reference to a direction of rotation of said shank about said longitudinal center line, and
   a third cutting edge disposed at said front cutting end at a location circumferentially spaced from a circumferentially forward end of said first cutting edge, said third cutting edge extending generally radially inwardly toward said recess, a longitudinaly forwardmost point of said third cutting edge being situated longitudinally rearwardly of a longitudinally forwardmost point of said first cutting edge, and a longitudinally rearwardmost point of said third cutting edge situated longitudinally forwardly said intersection of said chip face and said inner surface, said third cutting edge disposed at a circumferentially forward end of a clearance face which is recessed longitudinally rearwardly from said third cutting edge.

2. Drill according to claim 1, wherein said arc extends for 100 to 150 degrees.

3. Drill according to claim 1, wherein the length of the third cutting edge is at least 20% of the radius of the drill.

4. Drill according to claim 3, wherein the length of the third cutting edge is at least 25 to 50% of the radius of the drill.

5. Drill according to claim 1, wherein said longitudinally forwardmost point of said third cutting edge is spaced longitudinally rearwardly of said longitudinally forwardmost point of said first cutting edge by a distance corresponding to 1 to 20% of the length of said third cutting edge.

6. Drill according to claim 1, wherein said third cutting edge extends to said envelope surface.

7. Drill according to claim 1, wherein said recess has a partially circular periphery in cross-section, the radius of which is about 50 to 75% of the radius of the drill.

8. Drill according to claim 7, wherein the radius of said circular periphery is about 60 to 65% of the radius of the drill.

9. Drill according to claim 1, wherein a transition region where said recess opens into said envelope surface is beveled.

10. Drill according to claim 1, wherein portions of said envelope surface are removed, to form at least two axially extending, spaced apart radial relief segments having a radial dimension less than the maximum radial dimension of the drill, remaining portions of said envelope surface adjacent said radial relief segments defining at least three axially extending wear strip segments of the envelope surface having a radial dimension which is the maximum radial dimension of the drill whereby, during a drilling operation, the wear strip segments of the envelope surface serve to guide the drill within a hole being formed.

11. Drill according to claim 1, wherein said second cutting edge extends parallel to said center line.

12. Drill according to claim 1, wherein said first cutting edge lies in a plane disposed normal to said center line.

13. Drill according to claim 1, wherein the ends of said first cutting edge are displaced relative to each other longitudinally such that an end formed at a juncture between said first and second cutting edges is situated longitudinally forwardly of the other said end, to form an angle no greater than 2 degrees.

14. Drill according to claim 15, wherein said chip surface extends longitudinally rearwardly and radially inwardly from said first cutting edge to said inner surface.

15. Drill according to claim 1, wherein said drill includes a second chip surface extending radially inwardly and circumferentially rearwardly from said second cutting edge.

* * * * *